(12) United States Patent
Newman

(10) Patent No.: US 12,387,764 B2
(45) Date of Patent: *Aug. 12, 2025

(54) METHODS AND APPARATUS FOR ENABLING PLAYBACK OF CONTENT DURING AN ONGOING CAPTURE

(71) Applicant: GoPro, Inc., San Mateo, CA (US)

(72) Inventor: David Newman, Del Mar, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/633,898

(22) Filed: Apr. 12, 2024

(65) Prior Publication Data

US 2024/0257838 A1   Aug. 1, 2024

Related U.S. Application Data

(63) Continuation of application No. 17/619,525, filed as application No. PCT/US2020/039451 on Jun. 24, 2020, now Pat. No. 11,961,539.

(60) Provisional application No. 62/866,513, filed on Jun. 25, 2019.

(51) Int. Cl.
*G11B 27/28* (2006.01)
(52) U.S. Cl.
CPC .................................. *G11B 27/28* (2013.01)
(58) Field of Classification Search
CPC .................................................. G11B 27/28
See application file for complete search history.

(56) References Cited

U.S. PATENT DOCUMENTS

| 2005/0033758 A1 | 2/2005 | Baxter |
| 2005/0185823 A1 | 8/2005 | Brown |
| 2013/0238630 A1 | 9/2013 | Dhuse |

(Continued)

FOREIGN PATENT DOCUMENTS

WO   2013105965 A1   7/2013

OTHER PUBLICATIONS

Anonymous, "Using Your Smartphone's Camera to Live Stream Through Azure Media Services | Journey to the cloud", Feb. 5, 2016 (Feb. 5, 2016), XP055741095, 5 pages. Retrieved from the Internet: URL:https://wely-lau.net/2015/11/14/using-your-smartphones-camera-to-live-stream-through-azure-media-services/, [retrieved on Oct. 17, 2020].

(Continued)

*Primary Examiner* — Sunghyoun Park
(74) *Attorney, Agent, or Firm* — Esplin & Associates, PC

(57) ABSTRACT

Apparatus and methods for enabling indexing and playback of media content before the end of a content capture. In one aspect, a method for enabling indexing of media data obtained as part of a content capture is disclosed. In one embodiment, the indexing enables playback of the media data during the capture and before cessation thereof. In one variant, the method includes generating an "SOS track" for one or more images. The SOS track does not contain the same information as a full index, but provides sufficient information to allow an index to be subsequently constructed. In one implementation, the provided information includes identifiable markers relating to video data, audio data, or white space, but it does not provide an enumerated or complete "table of contents" as in a traditional index.

20 Claims, 10 Drawing Sheets

(56) References Cited

U.S. PATENT DOCUMENTS

| | | | |
|---|---|---|---|
| 2015/0270856 A1* | 9/2015 | Breynaert | H04L 27/3488 375/296 |
| 2017/0155974 A1* | 6/2017 | Stieglitz | G11B 27/3045 |
| 2018/0137892 A1* | 5/2018 | Ding | G11B 27/031 |
| 2019/0166180 A1* | 5/2019 | Zhao | H04L 65/613 |
| 2020/0137351 A1* | 4/2020 | Bai | H04N 7/12 |
| 2022/0310128 A1 | 9/2022 | Newman | |

OTHER PUBLICATIONS

Anonymous: "Adaptive Bitrate (ABR) Streaming—Unified Streaming", Apr. 21, 2019 (Apr. 21, 2019), XP055741638, 8 pages, Retrieved from the Internet: URL:https://web.archive.org/web/20190421071035/https://docs.unified-streaming.com/documentation/live/streaming.html [retrieved on Oct. 19, 2020].

Anonymous: "Dash Industry Forum: Specification of Live Media Ingest", Apr. 23, 2019 (Apr. 23, 2019), XP055741636, 28 pages, Retrieved from the Internet: URL:https://dashif-documents.azurewebsites.net/Ingest/pull/61/DASH-IF-Ingest.pdf [retrieved on Oct. 19, 2020].

Anonymous: "Understanding the HTTP Live Streaming Architecture: Apple Developer Documentation", Jun. 16, 2019 (Jun. 16, 2019), XP055741635, 2 pages, Retrieved from the Internet: URL:https://web.archive.org/web/20190616075104/https://developer.apple.com/documentation/http_live_streaming/understanding_the_http_live_streaming_architecture [retrieved on Oct. 19, 2020].

International Search Report and Written Opinion for App. No. PCT/US2020/039451, dated Dec. 21, 2020, 20 pages.

* cited by examiner

METHODS AND APPARATUS FOR ENABLING PLAYBACK OF CONTENT DURING AN ONGOING CAPTURE

PRIORITY

This application is a continuation of U.S. patent application Ser. No. 17/619,525 entitled "METHODS AND APPARATUS FOR ENABLING PLAYBACK OF CONTENT DURING AN ONGOING CAPTURE" filed on Dec. 15, 2021, which is a U.S. National Stage of PCT Application No. PCT/US2020/039451 entitled "METHODS AND APPARATUS FOR ENABLING PLAYBACK OF CONTENT DURING AN ONGOING CAPTURE" filed Jun. 24, 2020, which claims the benefit of priority to co-owned U.S. Patent Provisional Application Ser. No. 62/866,513 entitled "METHODS AND APPARATUS FOR ENABLING PLAYBACK OF CONTENT DURING AN ONGOING CAPTURE" filed Jun. 25, 2019, each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to video data processing and in one exemplary aspect, to enabling indexing and playback of at least a portion of content obtained during a capture while the capture is ongoing.

Description of Related Art

File indexing is a well-known technique for randomly accessing data from a file in order to locate data in the file. An index generally includes some data identifying a particular record in a file, as well as an address that can be used to locate that record on a storage medium. Accordingly, an index indicates a "table of contents" in which data (e.g., frames) are to be processed, thereby enabling playback of a captured scene (e.g., a time-lapse of a flower blooming). A video file without an index is malformed (and considered corrupted).

Additionally, indexes are typically created at the end of a capture (e.g., a recording by a user) because it is generally more efficient to do so as opposed to creating an index at the beginning of a capture, since the size of a video file for the capture is unknown until the end of the capture. More specifically, when a capture of a scene begins, a capture device will typically not know how long a user intends to capture the scene, so the index is written to the video file at the end of the video capture (when the user stops capture and hence the total duration is certain). In contrast, creating an index at the beginning of the capture may enable file recovery in that an index is present; however, such technique requires pre-allocating a large buffer for the index at the beginning of the file for the capture, as well as constantly updating and populating the index with new records during the capture. Accordingly, since creating the index at the end of a video file is generally more efficient, playback of captured content in a proper sequence typically requires "proper" stopping of the capture; otherwise, if the capture is improperly stopped (e.g., the battery for the capture device is detached, or the capture device is damaged), the index for the captured content may never be generated.

However, as the index is needed for playback of the captured content, the inability to playback captured content before the capture ends can frustrate user experience. For example, in a time-lapse capture, media is captured at a given interval. Such time-lapse captures depict changes in a "scene" in a shorter time period than which they occurred—e.g., a time-lapse of a flow of clouds or blooming of a flower captured over a span of several hours or days may be depicted in a ten-minute video. However, without being able to playback the time-lapse capture, a user would not know if the given interval at which the media is being captured is too fast or too slow, nor would the user know whether the time-lapse capture contains the desired content. For instance, if a user wants a time-lapse capture of a plane flying through clouds, the user has no way of previewing the time-lapse capture to see whether an airplane that flew by is actually visible in the captured content. Rather, the user would have to stop the time-lapse capture to review the captured content. However, once the time-lapse capture is stopped, the user cannot resume the same time-lapse capture; instead, the user would simply have to begin another time-lapse capture, wasting time and resources associated with the first time-lapse capture that was unsatisfactory to the user. The opportunity for a "second try" may no longer exist also (e.g., the airplane may be long gone).

Additionally, captured content is typically displayed on the capture device in real-time—i.e., images or a sequence of images (e.g., multiple frames of captured video content) are typically displayed by the capture device, thereby allowing the user to see what they are capturing in real-time. However, to see the captured content on the capture device, a user may need to move the capture device—e.g., a user may need to move a camera to eye-level in order to see the display on the camera. This can also frustrate user experience, as movement to the capture device which occurs during a media capture can be visibly noticeable in the captured media (e.g., cause a blur or shaking). In other words, fidgeting with the camera even a small amount will cause a perceptible video "discontinuity."

To these ends, solutions are needed to enable efficient indexing of captured content such that playback (and/or editing) of the captured content is possible while the content capture is ongoing. Ideally, in some scenarios, such solutions would further enable users to playback (and/or edit) captured content on a different device than the device being used for the capture (i.e., the capture device) so as to not disturb the ongoing content capture.

SUMMARY

The present disclosure satisfies the foregoing needs by providing, inter alia, methods and apparatus for enabling indexing of captured content for playback and/or editing of the captured content during an ongoing content capture.

In one aspect, a computerized method for enabling playback of captured media data while a data capture is ongoing is disclosed. In one embodiment, the method includes: (i) causing the data capture to start; (ii) receiving one or more images during the data capture; (iii) generating a data record for the one or more images; and (iv) analyzing the data record to generate track data. The track data is configured to enable a computerized client device to construct an index data structure. The index data structure enables playback of at least the one or more images during the capture. In one variant, the image(s) received during the data capture are received at a given interval. In another variant, the data capture is a time-lapse data capture and the given interval is a time lapse photo acquisition interval. In one implementation, the given interval is between 0.1 and 120 seconds.

In one embodiment, the computerized method can enable playback of the image(s), the playback including uploading the data record and the track data to a server apparatus. The server apparatus can be configured to cause display of the image(s) on the client device by using the track data to render the image(s) and other one or more images according to a proper sequence, which is indicated by the index data structure.

In various embodiments, analyzing the data record to generate track data includes algorithmically analyzing data relating to parameters of the image(s) to generate a code unique to the image(s).

In one embodiment, the computerized method also includes: causing the image(s) to be displayed on a computerized display device as a first loop; receiving one or more additional images during the data capture; generating a second data record for the one or more additional images; based on the first loop ending, causing the one or more images to be displayed on the display device with the additional images as a second loop. The index data structure can be updated with the second track data to indicate a proper sequence for the image(s) and the additional image (s). The second loop is displayed based on the updated index data structure.

In a further aspect, a method of playing back captured media data without utilization of a file (e.g., MP4) header is disclosed. In one embodiment, the playback occurs during ongoing media capture, and uses a plurality of track data elements stored at or near time of the associated data capture to enable ordering and playback before the media data file is closed.

In another aspect, a method of playing back captured media data is disclosed. In one embodiment, the playback occurs during ongoing media capture, and uses a plurality of track data elements stored at or near time of the associated data capture to enable a first ordering and playback before the media data file is closed. This first playback is coupled with generation of an index, which then allows subsequent iterations of the playback to occur based on the created index (versus the track data), and hence the second and subsequent playbacks may be in any order (including reverse).

In another aspect, a method of enabling editing of captured media data while a capture is ongoing is disclosed. In one embodiment, the method includes: receiving one or more images as part of a video data capture; generating a record for the image(s); and analyzing one or more parameters to generate data unique thereto; and based on receipt of user input, modify one or more aspects of the video capture before an end of the video data capture. The parameters are of at least one of: (i) the image(s) and (ii) the record. The generated data is configured to enable a computerized apparatus to construct an index, the index enabling the computerized apparatus to preview at least a portion of the video data capture. In one embodiment, the image(s) received during the data capture are received at a given interval as part of a time-lapse capture. In one variant, the modification of the aspects of the video capture causes the given interval to change for one or more additional images received as part of the video data capture. In one variant, the modification of the aspects of the video capture comprises adjusting the one or more parameters of the images. In one implementation, adjusting image parameters comprises changing data of the record with respect to a particular exposure setting.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device comprises a multi-logic block FPGA device.

In another aspect, a non-transitory computer readable storage apparatus implementing one or more of the foregoing aspects is disclosed and described. In one embodiment, the computer readable apparatus comprises a program memory, or an EEPROM. In another embodiment, the apparatus includes a solid state drive (SSD) or other mass storage device. In another embodiment, the apparatus comprises a USB or other "flash drive" or other such portable removable storage device. In one embodiment, the memory program includes a plurality of instructions configured to, when executed on a processing apparatus: receive first media data during a capture; generate a first data structure for the first media data; analyze the first data structure to generate a first track; receive second media data during the capture; generate a second data structure for the second media data; and analyze the second data structure to generate a second track.

The first data structure includes for instance data indicative of one or more parameters of the first media data. The first track comprises data unique to the first data structure. The first track enables a computerized client device to construct an index, which is configured to enable the computerized client device to access and locate the first data structure in a storage device and to playback the first media data. The second data structure includes for instance data indicative of one or more parameters of the second media data. The second track comprising data unique to the second data structure. The second track enables a computerized client device to reconstruct or update the index. The reconstructed or updated index can enable the computerized client device to access and locate the first and second data structures within the storage device and playback the first and second media data in accordance with a proper sequence.

In one embodiment, the plurality of instruction on the memory program are also configured to: insert or append the first track to the first data structure; insert or append the second track to the second data structure; and transmit, to the computerized client device, the first and second data structures having the first and second tracks respectively inserted therein or appended thereto.

In another embodiment, the first track comprises a unique hash derived from one or more of: (i) a given frame, and (ii) one or more prior frames within a sequence of frames. The unique hash further indicating a location of the first data structure within the proper sequence of a plurality of data structures, the plurality of data structures comprising an incomplete media file; and wherein the incomplete media files comprises a media file in which one or more data structures are being written therein.

In a further embodiment, the first and second tracks comprise identifiable markers of the first and second media data, respectively. In one variant, the one or more parameters of the first and second media data comprise at least two of:

(i) a time stamp, (ii) frame rate, (iii) frame number, (iv) metadata sample rate, (v) sample number information, and (vi) a real time clock output. In one implementation, the capture is performed by a camera device, and the first and second tracks enable file indexing by the computerized client device in the event the camera device is incapable of file indexing.

In another aspect, a computerized client device implementing one or more of the foregoing aspects is disclosed. In one embodiment, the computerized client device includes a first data interface configured to communicate data with a capture device; a processor apparatus in data communication with the first data interface; and a storage apparatus in data communication with the processor apparatus, and comprising at least one computer program, the at least one computer program comprising a plurality of instructions.

In one variant, the instruction are configured to, when executed by the processor apparatus: during a media data capture by the capture device, transmit data representative of a request to playback a plurality of first digital content elements obtained during the media data capture up to a specified point within the media data capture; based at least on the request, obtain: (i) the plurality of first digital content elements, and (ii) a plurality of first track data respectively associated with the plurality of first digital content elements; utilize the plurality of first track data to construct an index. In one implementation, the index indicates at least a sequence in which the plurality of first digital content elements are to be rendered; and the instructions are further configured to render the plurality of first digital content elements in accordance with the sequence, wherein the rendering causes the computerized client device to display at least video associated with the media data capture up to the specified point.

In one embodiment, the instructions are also configured to: during a media capture by the capture device, transmit data representative of a second request to playback the plurality of first digital content elements with one or more second digital content elements, the one or more second digital content elements obtained during the media capture after the specified point; based at least on the second request, obtain: (i) the one or more second digital content elements, and (ii) one or more second track data respectively associated with the one or more second digital content elements; utilize the one or more second track data to update the index, wherein the updated index indicates an updated sequence in which the one or more second digital content elements are to be rendered with the plurality of first digital content elements; and render the plurality of first digital content elements with the one or more second digital content elements in accordance with the updated sequence, wherein the rendering causes the computerized client device to display an updated video of the media data capture up to and after the specified point.

In one variant, the instructions are also configured to receive an input from a user of the computerized client device, the input configured to cause the capture device to stop the media data capture after the display of the video of the media data capture up to the specified point, the specified point comprising a then-current time.

In one embodiment, the display of the video of the media data capture up to the specified point comprises display of the video of the media data capture up to a then-current time, and comprises a first loop of the media data capture; and the display of the updated video of the media data capture up to and after the specified point comprises display up to and after the then-current time via at least a second loop or refresh of the first loop while the media data capture is ongoing. In one variant, the capture device is a camera used in an application where temporal continuity of captured media data is critical.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

Figure (or "FIG.") 1A is a block diagram of one exemplary media processing system, in accordance with the principles of the present disclosure.

All Figures disclosed herein are © Copyright GoPro, Inc. All rights reserved.

DETAILED DESCRIPTION

Implementations of the present technology will now be described in detail with reference to the drawings, which are provided as illustrative examples and species of broader genus' so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Moreover, while primarily discussed in the context of capturing camera media within the context of a standalone camera (e.g., a GoPro Fusion® camera manufactured by the Assignee hereof, a GoPro Hero® camera, etc.), the present disclosure is not so limited. In fact, the methodologies and apparatus described herein may be readily applied to other types of image capture devices or non-image capture devices. For example, the principles of the present disclosure may be readily applied to other types of computing devices such as, for example, a desktop computer, a laptop computer, a tablet computer, etc., whether they are capable of image capture or otherwise.

These and other variations would be readily apparent to one of ordinary skill given the contents of the present disclosure.

Exemplary Media Processing Systems—

Figure 1A:
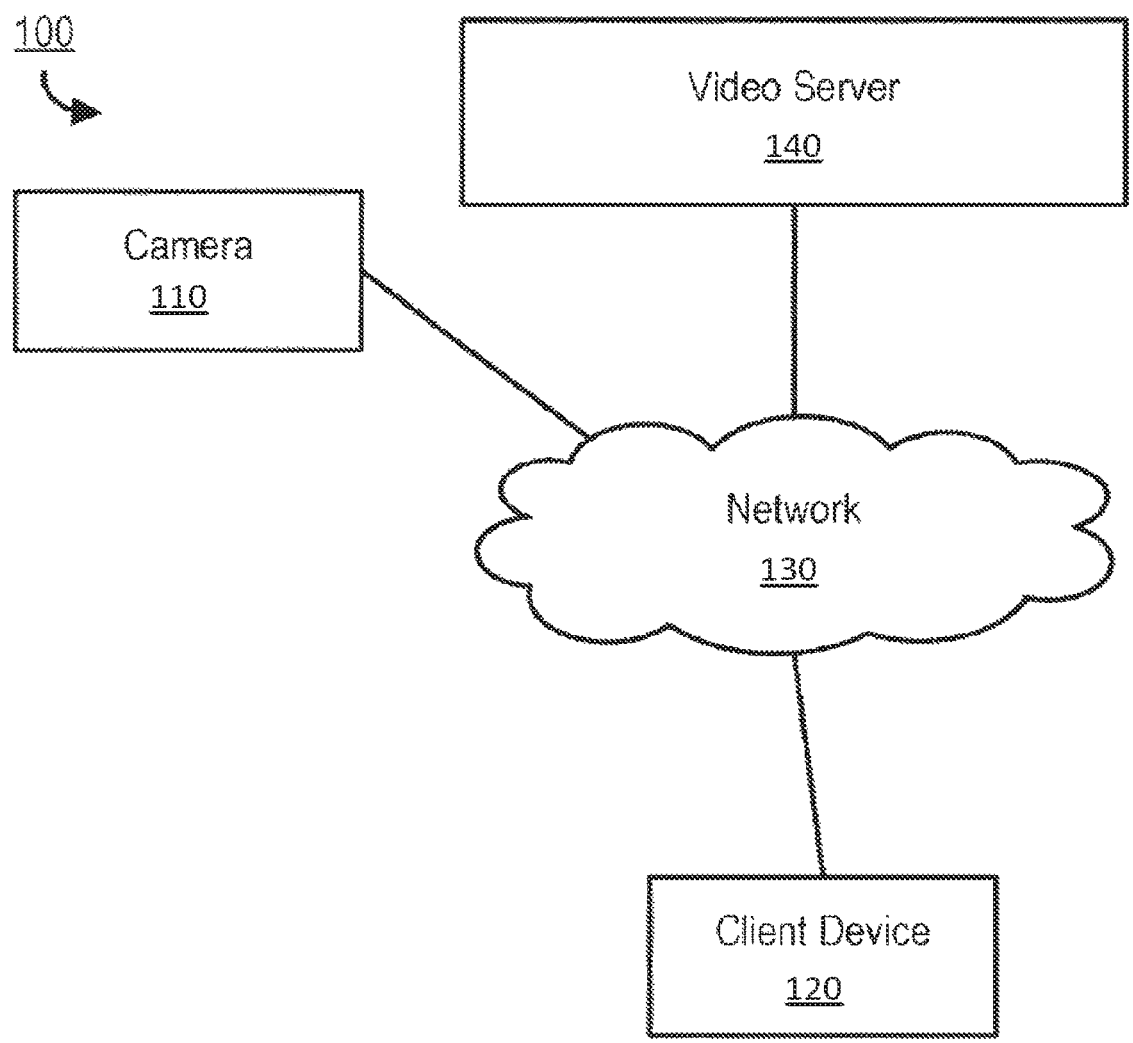
FIG. 1B is a block diagram of another exemplary media processing system, in accordance with the principles of the present disclosure.

FIG. 1A is a block diagram of a media content system 100, according to one embodiment. The media content system 100 may include a capture device (e.g., a camera) 110, a client device 120, a network 130, and a video or cloud server 140. In alternative configurations, different and/or additional components may be included in the media content system 100 shown.

The camera 110 can include a camera body, one or more a camera lenses, various indicators on the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the one or more lenses and/or performing other functions. In one embodiment, the camera 110 may capture images using a wide-angle lens that introduces some lens distortion into the image, such as, for example, a fisheye effect via a spherical lens polynomial. In this example, the projection of the captured images onto a rectangular display may result in the appearance of increased distortion (e.g., curvature) in the edge and corner regions of the images relative to the center region thereof. For example, straight lines in the scene that are centered in the image may appear relatively straight, but straight lines in the scene may appear increasingly curved near the edge and corner regions of the image as the distance from the center increases. Furthermore, in a fisheye lens, objects of equal size in the scene may appear larger in the center region and may appear increasingly smaller as they approach the edges. In one embodiment, the camera 110 may capture spherical or substantially spherical content via two or more wide-angle lenses (e.g., two hyper-hemispherical lenses pointed in opposite directions in a so-called Janus configuration). In other embodiments, the camera 110 may capture images or video having another non-rectilinear field of view in which some curvature is introduced into the images as an artifact of the lens parameters.

The video or cloud server 140 may receive and store videos and/or images captured by the camera 110. Furthermore, in one embodiment, the video server 140 may provide the user with an interface, such as a web page or native application installed on the client device 120, to playback, interact with, and/or edit the stored videos. The videos stored by the video server 140 may include traditional videos having, for example, 30 frames per second or 60 frames per second, or videos formed from a sequence of burst-captured images or time-lapsed images. It will be appreciated that the "network" 130 shown in FIG. 1A may be anything ranging from a small PAN or piconet (e.g., highly spatially localized), with the server 140 comprising e.g., another device or process of the user, to a WAN or MAN or internet/intranet (e.g., wherein the server 140 is a cloud or web server).

In a burst mode, for example, the camera 110 may capture a given number of frames (burst of images) over a given time window, typically in rapid succession. In some implementations, the number of images per burst may be configured by the user, e.g., between 1 and 1000. In some implementations, the time window duration may be user selected (e.g., between 0.1 s and 10 s) or dynamically configured by the camera given user preferences (e.g., inter-shot duration), detected user activity (e.g., sky diving, surfing, biking) via e.g., an installed accelerometer or other means, available storage, image resolution, bracketing configuration (e.g., 3 exposures per shot), and/or other settings. By way of an illustration, a skateboarder, attempting to record a jump, may configure the camera to collect a burst of 30 frames within 1 s time window.

When operating in a time lapse mode, the camera 110 may be configured to capture one or more images at a given interval. The capture may commence based on an indication by the user (e.g., press of the record button, voice command, camera shake, clap, and/or other indication, such as being triggered by the aforementioned accelerometer detecting acceleration in one or more Cartesian or spherical dimensions). In some implementations, the time lapse image acquisition may be initiated automatically by the camera based on a given condition (e.g., timer expiration, parameter breaching a threshold (e.g., ambient light reaching a given level during pre-dawn/dawn), arrival of a wireless communication (e.g., text message, ping), and/or other condition). The time lapse photo acquisition interval may be configured, for example, between 0.1 s and 120 s. In some implementations of time lapse photo acquisition, the camera 110 may be configured to take a single image (photo) at the specified interval or a plurality of images (e.g., 2-100). Multiple images may be utilized, e.g., when bracketing for exposure and/or focus distance.

A user can interact with interfaces (e.g., software APIs or other) provided by the video server 140 via the client device 120 in order to edit or view the videos and images. The client device 120 may be any computing device capable of receiving user inputs and viewing video content. Furthermore, the client device 120 may be capable of transmitting and/or receiving data via the network 130. For example, the client device 120 may be capable of receiving captured A/V data and constructing an index from one or more "SOS" tracks (as discussed in further detail below) in order to playback the A/V data in a correct sequence.

In one embodiment, the client device 120 may be a conventional computer system, such as a desktop or a laptop computer. Alternatively, the client device 120 may be a device having computer functionality, such as a personal digital assistant (PDA), a mobile telephone, a smartphone or another suitable device. The user can use the client device 120 to view and interact with or edit videos stored on, inter alia, the video server 140. For example, the user can view web pages including video summaries for a set of videos captured by the camera 110 via a web browser on the client device 120. Alternatively, the editing and viewing interfaces described herein may execute locally on the client device 120 without necessarily requiring the video server 140.

One or more input devices associated with the client device 120 receive input from the user. For example, the client device 120 can include a touch-sensitive display, a keyboard, a trackpad, a mouse, a voice recognition system, and the like. In some embodiments, the client device 120 can access video directly from the camera 110, and then transfer the accessed video to the video server 140 or view the video locally on the client device 120. While FIG. 1A shows a single client device 120, in various embodiments, any number of client devices 120 may communicate with the video server 140 and/or camera 110.

The network 130 enables communication between the video server 140, the client device 120, and the camera 110. As previously noted, the network 130 may include any combination of local area and/or wide area networks, using both wired and/or wireless communication systems. In one embodiment, the network 130 uses standard communications technologies and/or protocols thereby enabling broad compatibility and ubiquitous connectivity.

Various components of the environment 100 of FIG. 1A such as the camera 110, video server 140, and client device 120 can include one or more processors and a non-transitory computer-readable storage medium storing instructions therein that when executed cause the processor to carry out the functions attributed to the respective devices described herein. Furthermore, the processes described herein may be performed in the camera 110, on the video server 140, and/or on the client device 120, including distribution of processes or tasks across two or more platforms.

Figure 1B:
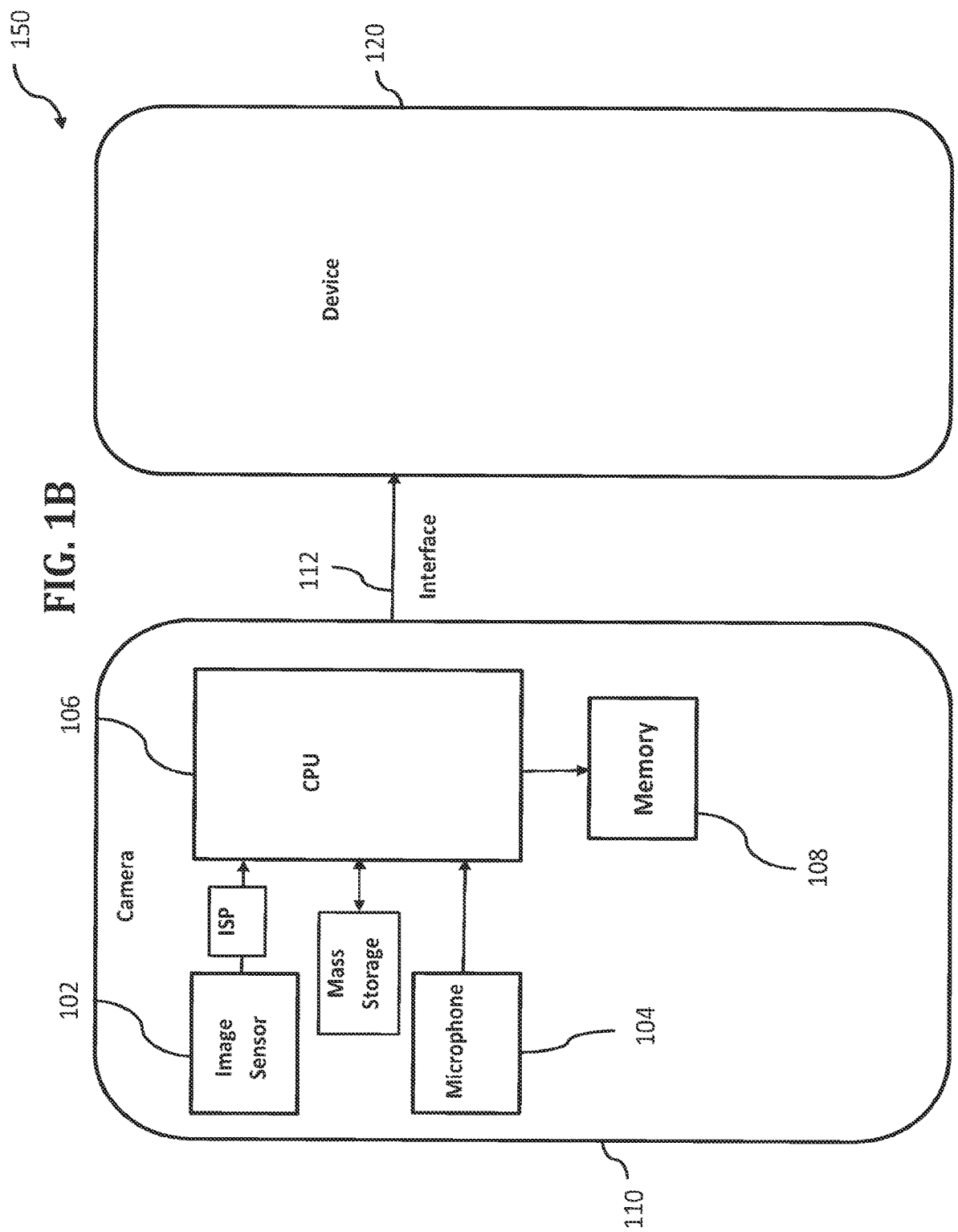

Referring now to FIG. 1B, a block diagram of a media content system 150 according to one embodiment is shown. The media content system 150 may include just the capture device (e.g., camera) 110 and the client device 120. The camera 110 may include one or more image sensors 102. The one or more image sensors 102 may capture digital images (e.g., still photos) or video (e.g., a time-lapse of a "scene"). In the context of captured video, the video captured can be thought of as a sequence of images (or a sequence of "frames").

Each captured image may include a two-dimensional array of pixels. The captured images or frames depict a "scene," which may include, for example, landscape, people, objects, that are each represented by captured pixels. Each pixel represents a depicted point in a scene captured in, for example, the digital video. Furthermore, each pixel is located at a pixel location, referring to, for example, (x,y) coordinates of the pixel within the image or frame. For example, a pixel may comprise {Red, Green, Blue} (RGB) values describing the relative intensities of the colors sensed by the one or more image sensors 102 at a particular set of (x,y) coordinates in the frame. In some implementations, the one or more image sensors 102 may capture video suitable for providing output videos having high definition resolutions (for example, 8K resolution, 4K resolution, 2K resolution, 1080p, 1080i, 960p, 720p and the like), standard definition resolutions, or other types of resolutions. The one or more image sensors 102 may capture video at one or more frame rates such as, for example, 120 frames per seconds (FPS), 60 FPS, 48 FPS, 30 FPS and any other suitable frame rate.

Additionally, the one or more image sensors 102 may include a lens that allows for wide-angle or ultra wide-angle video capture having a field of view (FOV) of, for example, 90 degrees, 127 degrees, or 170 degrees, 180+ degrees, although other FOV angles may be used. For example, in the context of the GoPro Fusion® series of cameras manufactured by the Assignee hereof, the camera 110 may include a pair of image sensors (with respective lenses) that are arranged in a generally back-to-back orientation with each of the image sensors capturing a hyper-hemispherical FOV (e.g., approximately 190 degrees each). In the context of a traditional GoPro Hero® series of cameras manufactured by the Assignee hereof, a single image sensor 102 may capture a scene.

The camera 110 may further include one or more microphones 104 that capture the sounds associated with, for example, a captured scene. For example, in some implementations, a plurality of microphones 104 are utilized by the camera 110 in order to provide, inter alia, directionality of sound for objects within the captured scenes. In some implementations, a single microphone 104 may be present on the camera 110. These and other variations would be readily apparent to one of ordinary skill given the contents of the present disclosure.

The camera 110 may further include one or more processing apparatus such as a CPU 106, Image Signal Processor (ISP) and GPU that is/are in data communication with the image sensor(s) 102. The processing apparatus 106 may generate an image file in one of various formats. Such image file formats may include, but are not limited to, Joint Photography Experts Group (JPEG)/JPG, PNG, BMP, Tagged Image File Format (TIFF)/TIF, GIF, as well as various types of Raw imaging formats. The processing apparatus 106 may generate video file(s) that are in one of various formats including HEVC, MP4, MPEG, AVI, or MOV formats. Yet other known file types may be used as would readily appreciated by one of ordinary skill given the contents of the present disclosure.

As described in further detail below, in some embodiments, the processing apparatus 106 is capable of generating so-called "SOS tracks" for the media as the media is captured. The SOS tracks enable a device (e.g., client device 120) to, inter alia, construct a full index such that playback of the captured media is possible without stopping the capture. In some variants, the SOS track does not contain the same information as a full index, but provides sufficient information to allow an index to be constructed. In other words, the SOS track may provide identifiable markers of "video data," "audio data," "white space," etc., but in some implementations it may not provide an enumerated "table of contents" the way an index would. The media data and SOS tracks can then be sent over connection 112 to client device 120 (either automatically or based on user input).

Additionally, the camera 110 may include memory apparatus 108, which may be configured to store various content (e.g., A/V data, one or more media files (e.g., an image/video file), records, frames, SOS tracks, indexes, etc.). In other variants, however, captured content may be stored on an electronic or virtual storage system, such as the cloud or video store, or on client device 120.

Memory apparatus 108 may include any type of integrated circuit or other storage device adapted for storing digital data including, without limitation, flash memory cards or other types of fixed or removable memory, random access memory (RAM), dynamic RAM (DRAM), synchronous dynamic RAM (SDRAM) including double data rate (DDR) class memory and graphics DDR (GDDR) and variants thereof. Memory devices may be volatile or non-volatile. Non-volatile memory (e.g., flash memory) can store data for extended periods of time even in the absence of an external power source.

Client device 120 may receive/retrieve content and the SOS tracks via a wired or wireless data interface 112. For example, interface 112 may be a Bluetooth®/BLE interface, a USB-based interface, WLAN (e.g., IEEE Std. 802.11), or other PAN such as IEEE Std. 802.15.4. In some embodiments, the content and the SOS tracks may be transmitted by the camera 110 to the client device 120; whereas in other embodiments, the content and SOS tracks may be retrieved and read by the client device 120 from the camera's memory 108. Yet, in other embodiments, content may be received/retrieved based on various considerations, e.g., bandwidth availability, or network conditions and parameters.

Exemplary Existing Media Files and Indexing Thereof—

As alluded to above, file indexing is a well-known technique for randomly accessing data from a media file, where an index is generated in order to locate data in the file. Existing video formats (generic) support "white space" and/or other non-video data; however, the existing video formats require an index to identify video frames, etc. A video file without the index is malformed (and considered corrupted). An index can be created at the beginning or end of a media file; however, it is typically inefficient to index a video file of unknown length (such as are common with action cameras) until completion; so action cameras typically write the index to the video file at the end of the video capture (when the user stops capture).

Figure 2A:
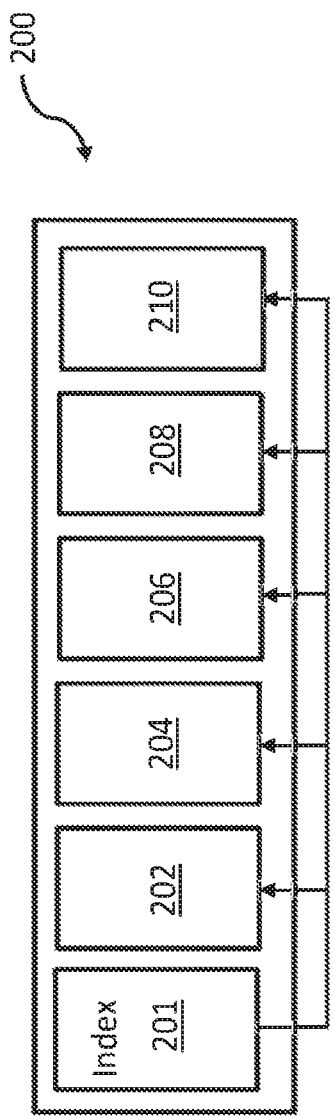
FIG. 2A is a graphical illustration of an exemplary existing media file having multiple individual records and an index generated at the beginning of a capture.
Figure 2B:
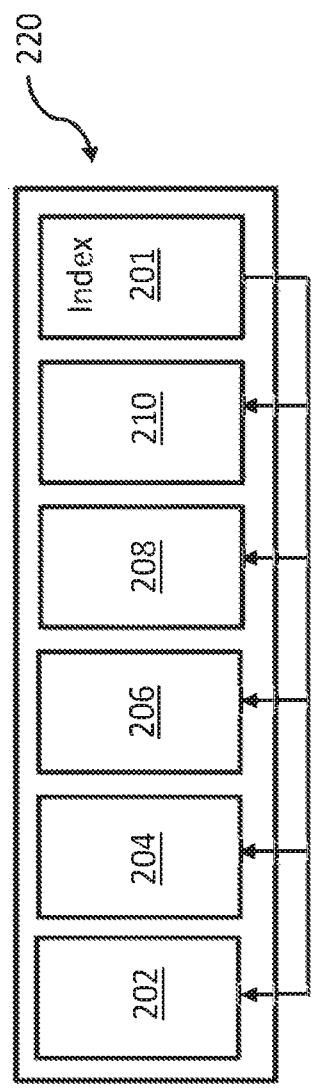
FIG. 2B is a graphical illustration of an exemplary existing media file having multiple individual records and an index generated at the end of a capture.

FIG. 2A is a graphical illustration of an exemplary existing media file 200 where the index is created at the beginning of a capture, whereas FIG. 2B is a graphical illustration of an exemplary existing media file 220 where the index is created at the end of a capture.

The media file 200 may include an index 201 and a plurality of records 202, 204, 206, 208, and 210. At the start of a video capture, an index 201 may be created. Until A/V data is received, the index 201 would not have any information corresponding to any A/V data. As A/V data is captured by a camera, records 202, 204, 206, 208, and 210 are generated for the captured A/V data. For example, when the first A/V data (which may correspond to a first image or frame) is received, a first record 202 can then be generated for that first image or frame. Typically, some data identifying record 202 and an address that can be used to locate record 202 will then be entered into index file 201. As new A/V data is received during the capture, records (e.g., records 204, 206, 208, and 210) will continue to be generated for the respective A/V data and included in the file 200. The index 201 will continue to be updated with information for each of the records. When the capture stops, no more records are generated and the index 201 is considered complete.

Placing the index 201 at the beginning of the file 200 has the advantage of enabling data recovery in the event the capture is interrupted (e.g., the camera or it battery is disabled or damaged). However, this technique conventionally requires pre-allocating a large buffer at the beginning of the file, because the size of the file 200 is unknown until the capture is complete. Additionally, placing the index 201 at the beginning of the file is bandwidth-intensive because the index 201 is constantly updating and populating data for new records during the capture. For example, as A/V data is captured, a record associated with that captured data must be generated and added to a file, so not only is new information written into the file, but an entry for this new record is inserted in the index 201 within space pre-allocated for the index 201.

The technique of FIG. 2B is the typical technique used for action cameras, which are mobile and therefore need to be more efficient and less bandwidth intensive. Placing the index 201 at the end of the file 220 is more efficient because it does not require pre-allocating space for the index 201 nor updating the index 201 as described above. However, such technique does not enable file recovery, and requires that the recording be properly stopped. In other words, if the capture is improperly stopped (e.g., the camera is damaged or runs out of battery), the index 201 is never created. Although the captured data may be recoverable if stored and the storage is recoverable, the captured data would merely be random data, and determining the sequence of that data in the file would be difficult and inefficient relative to having an index.

Exemplary Media Files Enabling Indexing—

Since action cameras are exposed to potentially destructive situations, the present disclosure in one embodiment provides a so-called "SOS track" that is written concurrently (or at least substantially concurrently) with the capturing of the content. In some variants, the SOS track does not contain the same information as a full index, but provides sufficient information to allow an index to be constructed. In other words, the SOS track may provide identifiable markers of "video data," "audio data," "white space," etc., but it does not provide an enumerated "table of contents" of the same type that an index would.

Figure 3A:
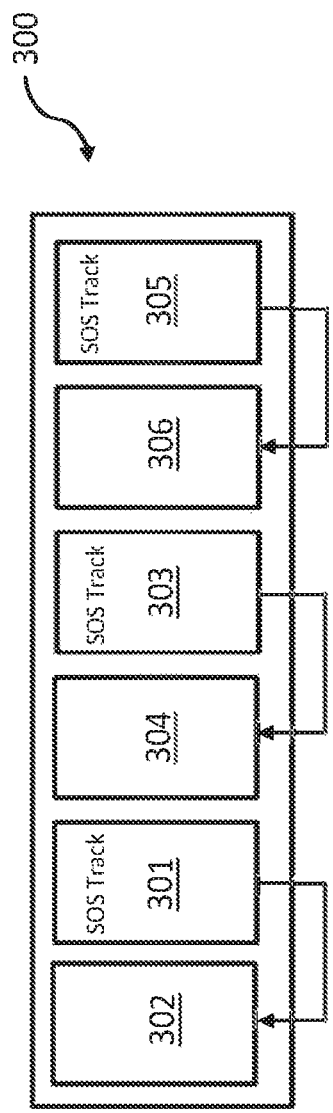
FIG. 3A is a graphical illustration of an exemplary media file, in accordance with the principles of the present disclosure.

FIG. 3A is a graphical illustration of an exemplary video file 300, in accordance with the principles of the present disclosure. When a capture begins, A/V data is captured/received and a first record or frame 302 is generated therefor. An SOS track 301 is then generated for the record/frame 302. As the capture continues, new A/V data is received/captured, a second frame/record 304 is generated therefor, and a second SOS track 303 is generated for the second frame/record 304. This process continues until the capture ends (i.e., the recording stops). In some embodiments, when the capture ends, as consistent with the current art (see FIG. 2B), an index (not shown in FIG. 3A) referencing the sequence/location for each frame or record can be generated at the end of the file 300; however, according to the present disclosure, in some variants, an SOS track would be generated for the index as well. This is considered redundant; however, the SOS track does not consume much bandwidth or storage space, so it may be more laborious to modify this process to not generate an index or an SOS track for the index than just allowing a redundant SOS track to be included in the media file. For instance, modification of extant codec software or other processes may be obviated in favor of merely consuming a bit more space via the SOS track for the index In one approach, the generating of the SOS track is accomplished via the analyzing of the captured content (e.g., A/V data, frame, or record) in order to determine unique characteristics of that content. That is, in some embodiments, the SOS track includes data indicative of, or derived from, one or more parameters of the content (e.g., A/V data, frame, or record). For example, the parameters may include data relating to: (i) the size of the record, and (ii) where the record is located within the sequence of records in the file. In some implementations, the SOS track may correspond to an individual video frame (e.g., $47^{th}$ frame) and therefore, the parameter could be the number of the frame or other identifying data, whether relative or absolute. Other parameters may include, for example: (i) a time stamp, (ii) frame rate, (iii) frame number, (iv) metadata sample rate, (v) a sample number information, (vi) a real time clock output, (vii) a unique code (e.g., hash) of a given frame as well as one or more prior frames within a sequence of frames, etc.

Accordingly, each SOS track is unique to at least the content (e.g., A/V data, frame, or record) with which it is associated (e.g., via appendage or insertion). For instance, audio data can be extracted from one record of a media file and applied to another record (e.g., to voice dub over a video); or the metadata can be extracted from one record and applied to another record (e.g., to change GPS coordinates associate with the latter file). In contrast, the SOS track is unique to the record, and therefore although it could be extracted and applied to another record, it would not cause any noticeable changes to or be useful with that record.

Figure 3B:
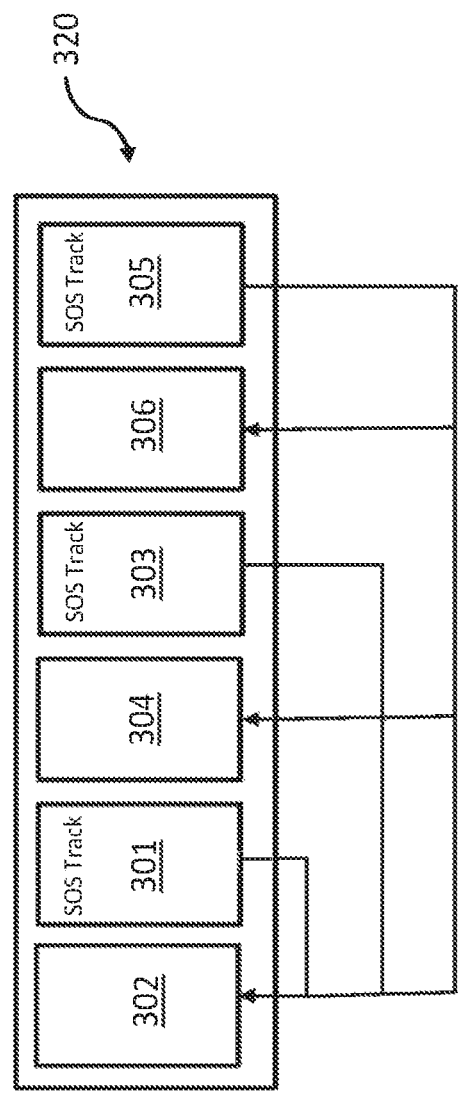
FIG. 3B is a graphical illustration of another exemplary media file, in accordance with the principles of the present disclosure.

Turning to FIG. 3B, an exemplary video file 320 in accordance with the principles of the present disclosure is shown. FIG. 3B is similar to FIG. 3A, except that the SOS tracks 301, 303, and 305 in FIG. 3B can be derived from one or more parameters associated with other surrounding or prior frames or records 302, 304, and 306.

For example, in one embodiment, the SOS track may correspond to multiple frames and/or a time slice in excess of the frame duration. For instance, the SOS track may include a start time (in the MOV/MP4 time-base) and the time duration (i.e., time-slice) that the SOS track represents. If a file is configured with a 10-frame GOP compression, the SOS track may include a code derived from an entry at time 0 with length 10, while another SOS may include a code derived from an entry at time 10 with length 10, while yet another SOS may include a code derived from an entry at time 20 with length 10, and so on. As such, an SOS track 303 associated with a frame 304 of captured video may be indicative of a time sequence for that frame (or sequence of frames), which may be dependent upon one or more surrounding frame(s) 302.

Advantageously, the SOS tracks enable file recovery since the SOS tracks allow a full index to be constructed, and the index indicates how each respective frame or record is supposed to be processed/rendered. However, unlike creating an index at the beginning of a capture, which may also enable file recovery, generating an SOS track for each frame or record does not require pre-allocating a large buffer at the beginning of the file, nor does it require updating the index each time new data is received.

Additionally, one salient aspect of the present disclosure is that the SOS tracks enable a device (e.g., client device 120 in FIGS. 1A and 1B) to construct (or reconstruct or update) an index without ending the capture. As the index enables playback, the SOS track(s) of the respective record(s) for the captured content enable the client device 120 to playback the captured content prior to cessation of the capture by the camera 110. In other words, captured content can be received/retrieved from the camera 110 by the client device 120 and rendered for playback on the client device 120 (or even on the camera itself if so equipped with rendering capability) via e.g., the client device 120 constructing an index from the SOS tracks, before the capture by the camera 110 has ended.

The foregoing technique is advantageous for, inter alia, security cameras. For example, a business may want to review a portion of video footage from the night before without stopping the security camera from recording. In the prior art, to review a portion of the security recording from the night before, the recording would need to be stopped so that an index for the video file could be created. However, with the aspects of the present disclosure, an index can be generated using the SOS tracks without stopping the recording. It will be appreciated by those of ordinary skill given the present disclosure that any scenario or use case where preview or review of captured data "on the fly" is desired is compatible with the principles and techniques of the present disclosure, the foregoing being merely one of a multitude of examples.

The foregoing technique is also advantageous for, e.g., time-lapse captures. Such time-lapse captures depict changes in a "scene" in a shorter time period than which they were occurred. For example, a time-lapse of a flow of clouds or blooming of a flower captured over a span of several hours or days may be depicted in a ten-minute video. However, there is currently no way of reviewing a time-lapse capture while the time-lapse capture is ongoing. This may frustrate user experience, as the user does not know if the time-lapse rate is satisfactory, and further may have difficulty gauging when it is a good time to stop the time-lapse capture. The user instead has to stop the time-lapse capture and review the time-lapse without knowing in advance how the time-lapse will look, and by that time it is too late to modify or resume the time-lapse capture.

Additionally, as described in more detail below, a portion of a capture (e.g., up to a then-current time, for example when the user requests playback) might be displayed as a loop. Further, new content captured during the same time-lapse capture, yet captured after the then-current time, can be displayed in another loop once the first loop ends or is refreshed. This allows a user to, inter alia, review the time-lapse capture to determine whether the time-lapse capture is satisfactory (and can be stopped properly at that point), or whether the time-lapse capture is not satisfactory and should continue or be changed.

Exemplary Frame or Record—

Figure 4:
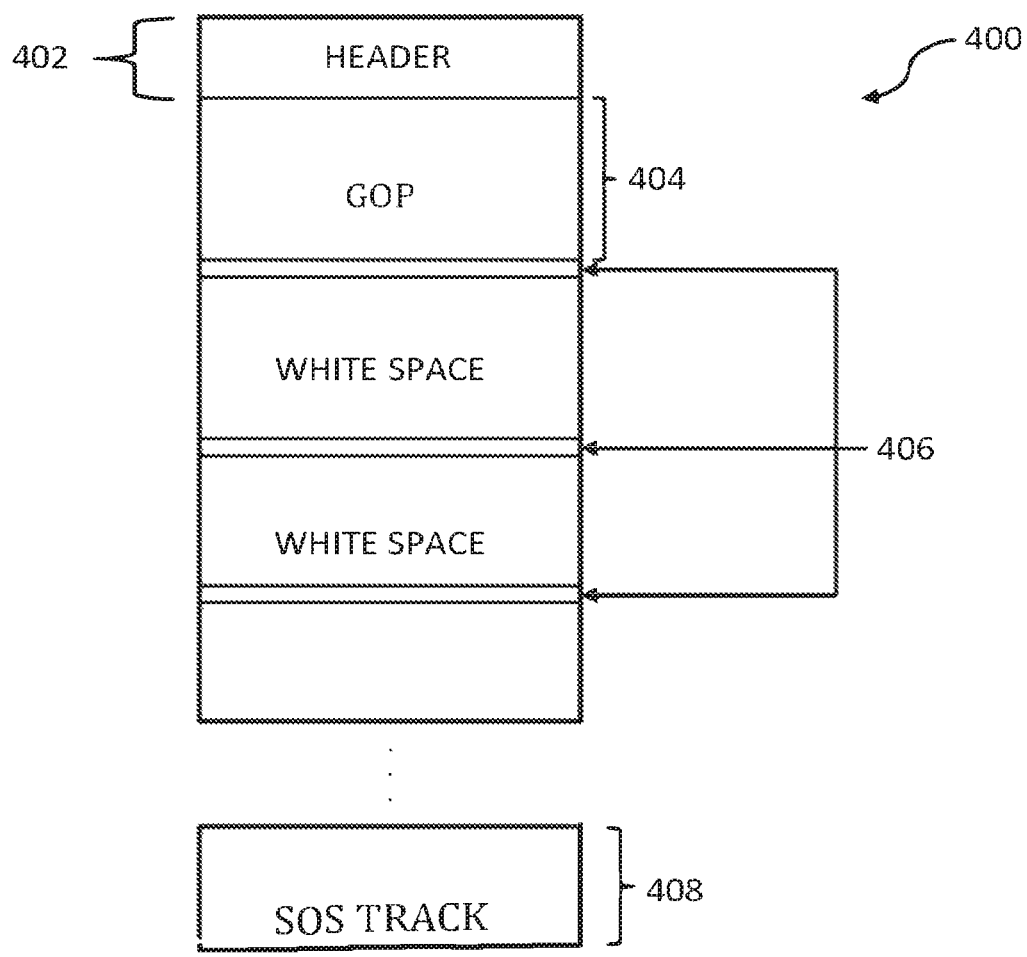
FIG. 4 is a graphical illustration of an exemplary record, in accordance with the principles of the present disclosure.

Referring now to FIG. 4, an exemplary frame or record 400 that includes an SOS track 408 is shown and described in detail. In some implementations, the frame/record 400 may take the form of, for example, an MPEG-4 (mp4) file format, a MOV file extension format, and/or any other suitable file format. The record 400 may include a header 402 as well as a frame or group of pictures (GOP) portion 404 within the file. Further, the record 400 may include "white space" 406 which may be encoded between the frame or GOP portions 404. The "white space" may include a variety of data, such as metadata. Metadata can include data indicative of, for example, aperture settings, exposure time, focal length, date and time taken, and location information, and may provide additional information with regards to the captured camera media such as lens polynomial data.

The record 400 may further include an SOS track 408 which, as discussed elsewhere herein, may be utilized by playback and/or editing tools, as well as for file recovery. In some embodiments, the generation of the SOS track 408 is accomplished via analyzing of the captured camera media in order to determine the unique characteristics of the content. That is, the SOS track 408 may include data indicative of one or more parameters of at least the record 400, or may include a unique code/hash/identifier derived from one or more parameters of at least the record 400. The parameters may include, for example, the size of the record 400 and/or the where the record 400 is located within the sequence of records that have been written in a media file (e.g., frame #47).

In some implementations, the SOS track 408 may correspond to an individual video frame (see, e.g., FIG. 3A above). However, in other implementations, the SOS track 408 may correspond to multiple frames and/or time slice in excess of the frame duration (see, e.g., FIG. 3B above). For example, the SOS track 408 may include, or at least may be a unique code derived from, a start time (in the MOV/MP4 time-base) and the time duration (i.e., time slice) that the SOS track 408 represents.

Exemplary Methodologies—

Figure 5:
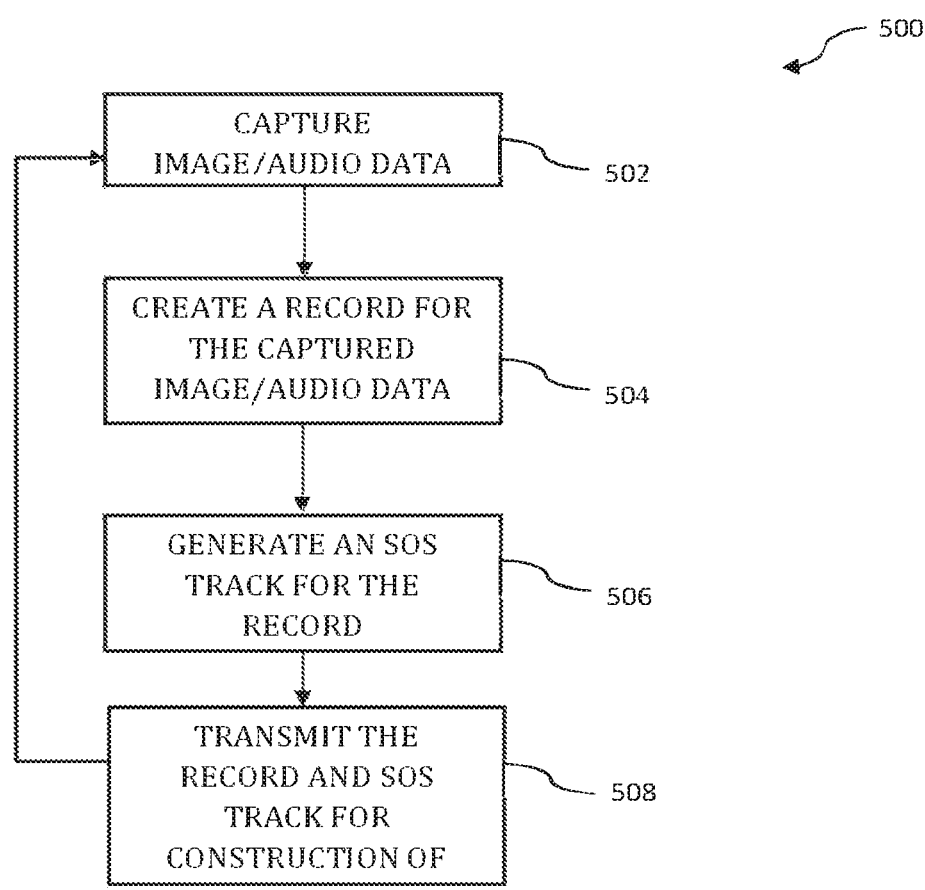
FIG. 5 is a logical flow diagram illustrating an exemplary methodology for generating one or more SOS tracks, in accordance with the principles of the present disclosure.

Referring now to FIG. 5, an exemplary logical flow diagram illustrating an exemplary methodology 500 for generating one or more SOS tracks is shown and described in detail.

At operation 502, imaging and/or audio data (collectively, "media") is captured. This captured media may be obtained using a variety of types of capture devices (e.g., cameras).

Panoramic captured media may be obtained using, for example, the GoPro Fusion® series of cameras manufactured by the Assignee hereof. As but one other non-limiting example, captured media may be obtained using, for example, a GoPro Hero® series of cameras manufactured by the Assignee hereof. These and other variations would be readily apparent to one of ordinary skill given the contents of the present disclosure.

In one exemplary embodiment, the media is captured in time-lapse mode. When operating in a time lapse mode, one or more images may be captured by the source device (e.g., camera) at a given interval. This given interval (herein referred to as the "time lapse photo acquisition interval") may be configured, for example, between 0.1 s and 120 s. In some implementations of time lapse photo acquisition, the camera may be configured to take a single image (photo) at each point of the specified interval, or to take a prescribed plurality of images (e.g., 2-100). Multiple images may be utilized, e.g., when bracketing for exposure and/or focus distance. Duration of the time lapse may be configured by the user in some embodiments. The frames are assembled into the time-lapse such that the frames are displayed at a faster rate than the capture rate. For example, whereas the capture rate can be one (1) frame every 10 seconds, the display rate can be 60 frames per second. Note also that some degree of "puncturing" or selective compression of the captured data may be utilized as well, such as where every Nth frame captured is eliminated from the time lapse.

As noted above, the capture may commence based on an indication by the user (e.g., press of the record button, voice command, camera shake, clap, and/or other indication). In some implementations, the time lapse image acquisition may be initiated automatically by the camera based on a given condition (e.g., timer expiration, parameter breaching a threshold (e.g., ambient light reaching a given level during pre-dawn/dawn), arrival of a wireless communication (e.g., text message, ping), and/or other condition).

At operation 504, a record (or frame) for the captured camera media is generated. For example, a single record or frame may include data relating to the captured imaging content as well as the captured audio content. Metadata may also be included in the record. Other information associated with metadata and/or content that may be disposed in the record can include, e.g., a time stamp, frame rate, frame number, metadata sample rate, a sample number information, a real time clock output, and/or other information. Additionally, although a record may be generated for each frame, in other implementations, the record may correspond to multiple frames and/or time slice in excess of the frame duration.

At operation 506, the SOS track for the record (or frame) is generated. As alluded to above, in some embodiments, the generation of the SOS track is accomplished via analysis of the captured camera media in order to determine the characteristics of the camera media. That is, the SOS track may include data indicative of, or derived from, one or more parameters of the record or camera media. The parameters may include, for example, the size of the record and the where the record is located within the sequence of records that have been written into the file. Accordingly, each SOS track is unique to the record with which it is associated. Additionally, in some variants, an SOS track data or code may be indicative of, or derived from, a time sequence for that frame (or sequence of frames), which may be dependent upon one or more surrounding frame(s).

In some implementations, the SOS track may be inserted into the record, whereas in other implementations, the SOS track may be appended to the record or even maintained as a separate data structure correlated to the record. Additionally, the SOS track may be disposed in any portion of the record. For example, the SOS track may be included at the bottom of the record as shown in the exemplary record 400 of FIG. 4.

Additionally, although the exemplary embodiments of the present disclosure include generating an SOS track for each record, in other embodiments, an SOS track may be generated on an intermittent basis; e.g., once every other record or once every third record. However, it is noted that in the event the camera is improperly stopped (e.g., the battery is removed or the camera is damaged), any media without an associated SOS track will be treated as random data, and may be difficult/inefficient to access and locate for playback (and hence may also be eliminated).

At operation 508, at least the record and SOS track associated therewith are transmitted (or accessed) for construction of a full index. By uniquely identifying individual records or frames, the respective SOS track(s) enable construction of an index such that playback of the captured content is possible while the content capture is still ongoing. In some embodiment, the entire media file (including the records and SOS tracks) can be transmitted to the client device, and the client device can be configured to extract the SOS tracks from the media file in order to construct the index.

In some implementations, the transmission of the records and SOS track may be initiated automatically by the camera based on a given condition, such as a timer expiration, parameter breaching a threshold (e.g., ambient light reaching a given level during pre-dawn/dawn), arrival of a wireless communication (e.g., text message, ping), and/or other condition). In other implementations, the transmission of the records and SOS track may commence based on a request by the user (e.g., press of the record button, voice command, camera shake, clap, and/or other indication). Other schemes for transmission may be used, such as transmission media availability (e.g., a sense and random backoff when the medium is occupied). Aggregation of a sufficient amount of data before transmission may also be utilized (e.g., N bytes).

In some variants, the record and SOS track associated therewith can be transferred directly, over a an interface (such as a Bluetooth® connection), from the camera 110 to the client device 120, as shown in FIG. 1B. In other variants, the record and SOS track associated therewith can be transferred first to a video server apparatus 140, over a network, and then from the video server 140 to the client device 120, as shown in FIG. 1A. The SOS track(s) and record(s) may be transmitted automatically or based on user input (e.g., via a button press). Other configurations are consistent with the present disclosure.

Additionally, the record (including, e.g., the captured image/audio data and the SOS track) may be (optionally) stored. For example, this captured image/audio data may be stored locally on the capture device (e.g., camera 110). In other implementations, the record may be stored remote from the capture device (e.g., on client device 120, or in an electronic storage medium such as the "cloud"). Storage on a removable media such as a flash drive or storage card may be used as well.

Figure 6:
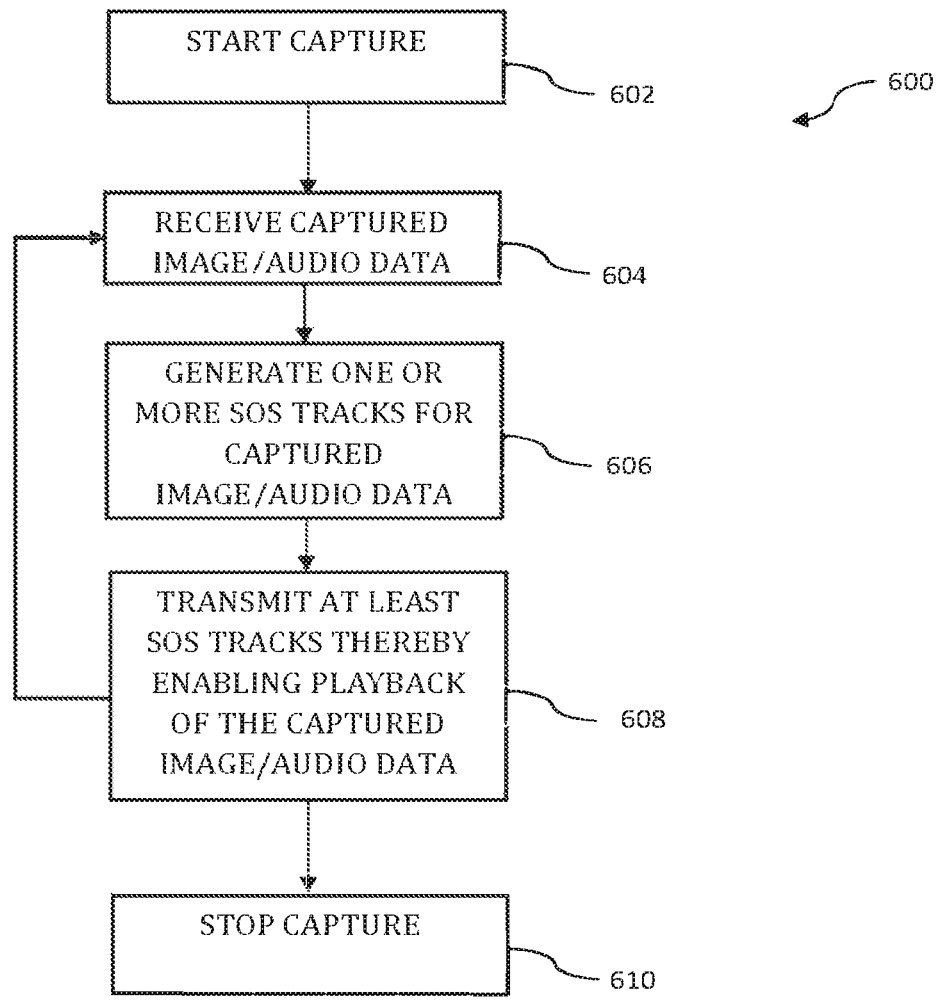
FIG. 6 is a logical flow diagram illustrating an exemplary methodology for enabling playback of content during an ongoing content capture, in accordance with the principles of the present disclosure.

Referring now to FIG. 6, a logical flow diagram illustrating an exemplary methodology 400 for enabling playback of content during an ongoing content capture is shown and described in detail.

At operation 602, the capture begins. As noted above, the capture may commence based on an indication by the user (e.g., press of the record button, voice command, camera shake, clap, and/or other indication). In some implementations, the capture may be initiated automatically by the camera based on a given condition (e.g., timer expiration, parameter breaching a threshold (e.g., ambient light reaching a given level during pre-dawn/dawn), arrival of a wireless communication (e.g., text message, ping), and/or other condition).

At operation 604, the captured image/audio data is received. As described above, when operating in a time lapse mode, one or more images may be captured by the camera at a given interval. This interval may be configured, for example, within a range of values between X and Y (e.g., 0.1 s and 120 s). In some implementations, the camera device may receive a single image (photo) at the specified interval or a plurality of images (e.g., 2-100). Multiple images may be utilized, e.g., when bracketing for exposure and/or focus distance. Duration of the time lapse may be configured by the user.

At operation 606, one or more SOS tracks are generated for the image/audio data. In one embodiment, the received/captured A/V data is indexed by way of, for example, the exemplary methodology 500 of FIG. 5. For example, as the image/audio data is captured/received by the camera, a record is generated and an SOS is generated for each record (via, e.g., analyzing the captured camera media in order to determine the characteristics thereof, and generating a code unique thereto). At this point, new image/audio data is still being captured/received and SOS tracks are still being generated therefor, as the capture has not been stopped.

As referenced above, the SOS track can include data indicative of, or derived from, one or more parameters of the content (e.g., image/audio data, frame, record, etc.). Such parameters may include, for example: (i) the size of the record (e.g., file size of the frame), (ii) the location of the record within the sequence of records that have been written into the file (e.g., $47^{th}$ frame), (iii) a time stamp, (iv) frame rate, (v) frame number, (vi) metadata sample rate, (vii) a sample number information, (viii) a real time clock output, (ix) a unique code (e.g., hash) of a given frame as well as a unique code (hash) of one or more prior frames within a sequence of frames, etc.

At operation 608, at least the SOS tracks are transmitted for playback of the captured image/audio data. In some implementations, the transmission includes uploading the SOS tracks and captured content over a network (e.g., network 130 in FIG. 1) to a server apparatus (e.g., video server 140 in FIG. 1) for processing (e.g., translating, transrating, transcoding, etc.) before they are transmitted to, and displayed on, a user device (e.g., client device 120 in FIGS. 1A and 1B, respectively). In other implementations, the SOS tracks (and captured content) can be transmitted directly to the user device for playback (and/or editing).

The SOS tracks allow the server/client apparatus to construct an index, and the index allows the server/client apparatus to randomly access and locate data from a storage medium in a proper sequence. As new records are created for newly captured content, the SOS tracks for those new records are generated and transmitted to the client device or server apparatus, which enables a client device or server apparatus to display all of the captured content up to a then-current time and without needing to stop the capture.

Accordingly, the playback of the captured image/audio data might include, in some variants, looping or refreshing of a feed of the time-lapse capture. In other words, as new content of the time-lapse is captured, the newly captured content will be displayed with at least a portion of the previously displayed captured content as a new loop begins or is refreshed.

At operation 610, the capture can be stopped. As noted above, an index is sometimes created at the end of the capture. Thus, according to some variants of the present disclosure, an SOS track might be created for the index. Although this may be redundant, the redundant SOS track does not consume much storage space or processing overhead, and such technique of creating an SOS track for each record throughout the ongoing capture is more efficient than creating the index at the beginning of the entire media file.

Figure 7:
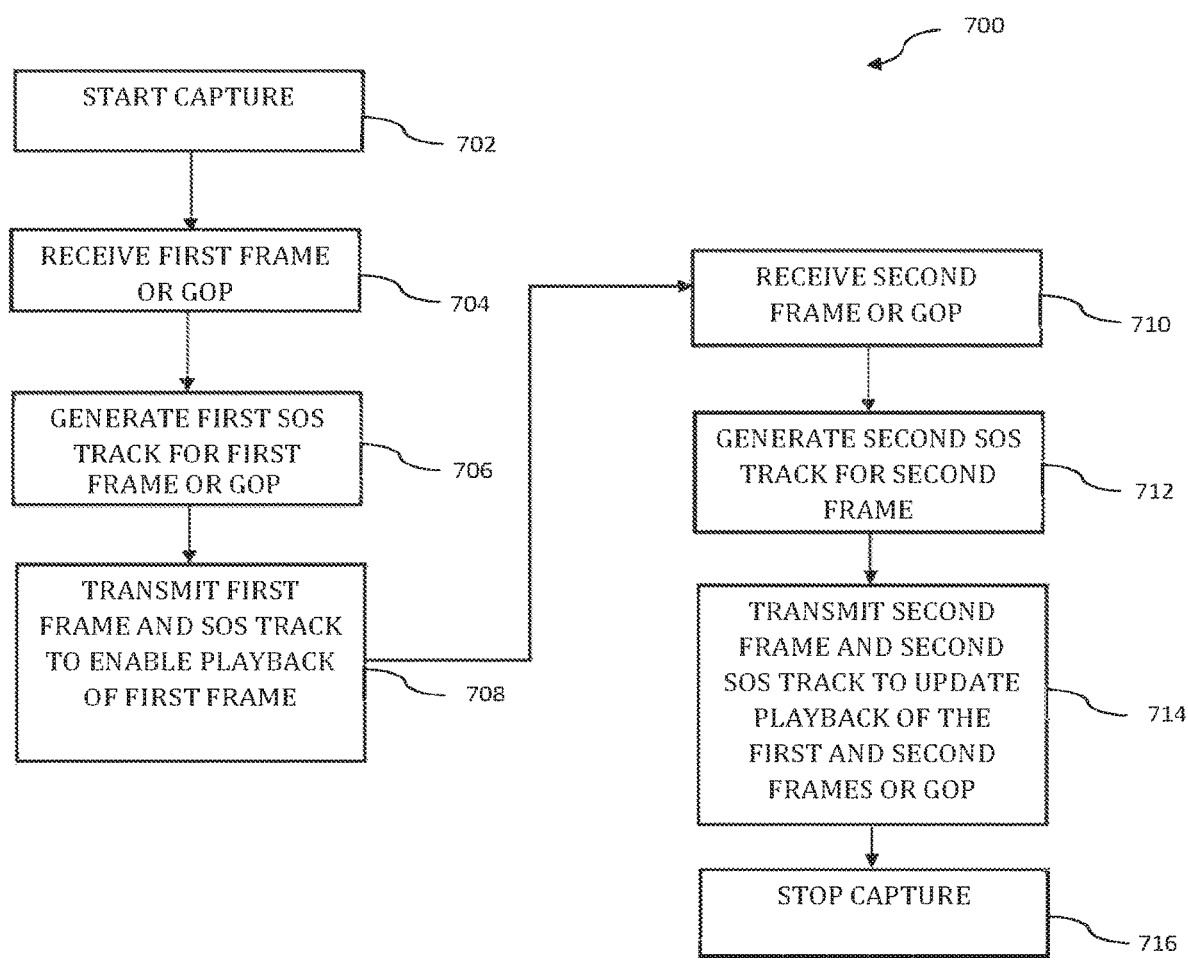
FIG. 7 is a logical flow diagram illustrating an exemplary methodology for the playback of image/audio data during a time-lapse capture, in accordance with the principles of the present disclosure.

Referring now to FIG. 7, a logical flow diagram illustrating an exemplary methodology 700 for enabling playback of content during an ongoing content capture is shown and described in detail.

At operation 702, the content capture begins. At operation 704, the first frame or group of pictures (GOP) is received.

At operation 706, a first SOS track for the first frame or GOP is generated. In one embodiment, the frame or GOP may be represented by data included in a record as part of a media file and an index may be generated for that record.

As referenced above, the generation of the SOS track includes, in some variants, analyzing the captured camera media (e.g., frame or GOP) in order to generate a unique code corresponding thereto. The SOS track can include data indicative of, or derived from, one or more parameters of the captured content, such, for example: (i) the size of the content (e.g., file size of the frame), (ii) the location of the content within the sequence of content (e.g., $47^{th}$ frame within 100 frames), (iii) a time stamp, (iv) frame rate, (v) frame number, (vi) metadata sample rate, (vii) a sample number information, (viii) a real time clock output, (ix) a unique code (e.g., hash) of a given content element (e.g., a frame) as well as one or more prior content elements within a sequence of frames, etc.

At operation 708, the first frame and first SOS track is transmitted (to a display device, such as client device 120), thereby enabling playback of the first frame or GOP. For example, a client device (e.g., client device 120 in FIGS. 1A and 1B, respectively) may utilize the first SOS track to construct an index which enables the client device to locate and read the first frame from storage (e.g., storage on the client device). Alternatively, the first frame and first SOS track may be uploaded over a network (e.g., network 130 in FIG. 1A) to a server apparatus (e.g., video server 140 in FIG. 1A) for processing (e.g., translating, transrating, transcoding, etc.) before they are transmitted to, and displayed on the client device. The first SOS track allows the client device and/or server apparatus to construct an index, which allows the client device and/or server apparatus to locate the first frame on a storage device and render it for playback without stopping the content capture. Accordingly, content is still being captured, and a second frame or GOP is received (per operation 710).

At operation 712, an SOS track is generated for the second frame or GOP. The transmission (per operation 714) and use of this second SOS track allows the client device and/or server apparatus to update the constructed index (or reconstruct the index) such the client device and/or server apparatus is able to access and locate the second frame or GOP, and playback of this new (second) frame or GOP with the first frame or GOP. Accordingly, the client device and/or server apparatus can playback all of the content captured up to a then-current time. Accordingly, a user may preview or review their capture before stopping it. Once the user is satisfied with their capture, they may stop the time-lapse capture per operation 716.

Figure 8:
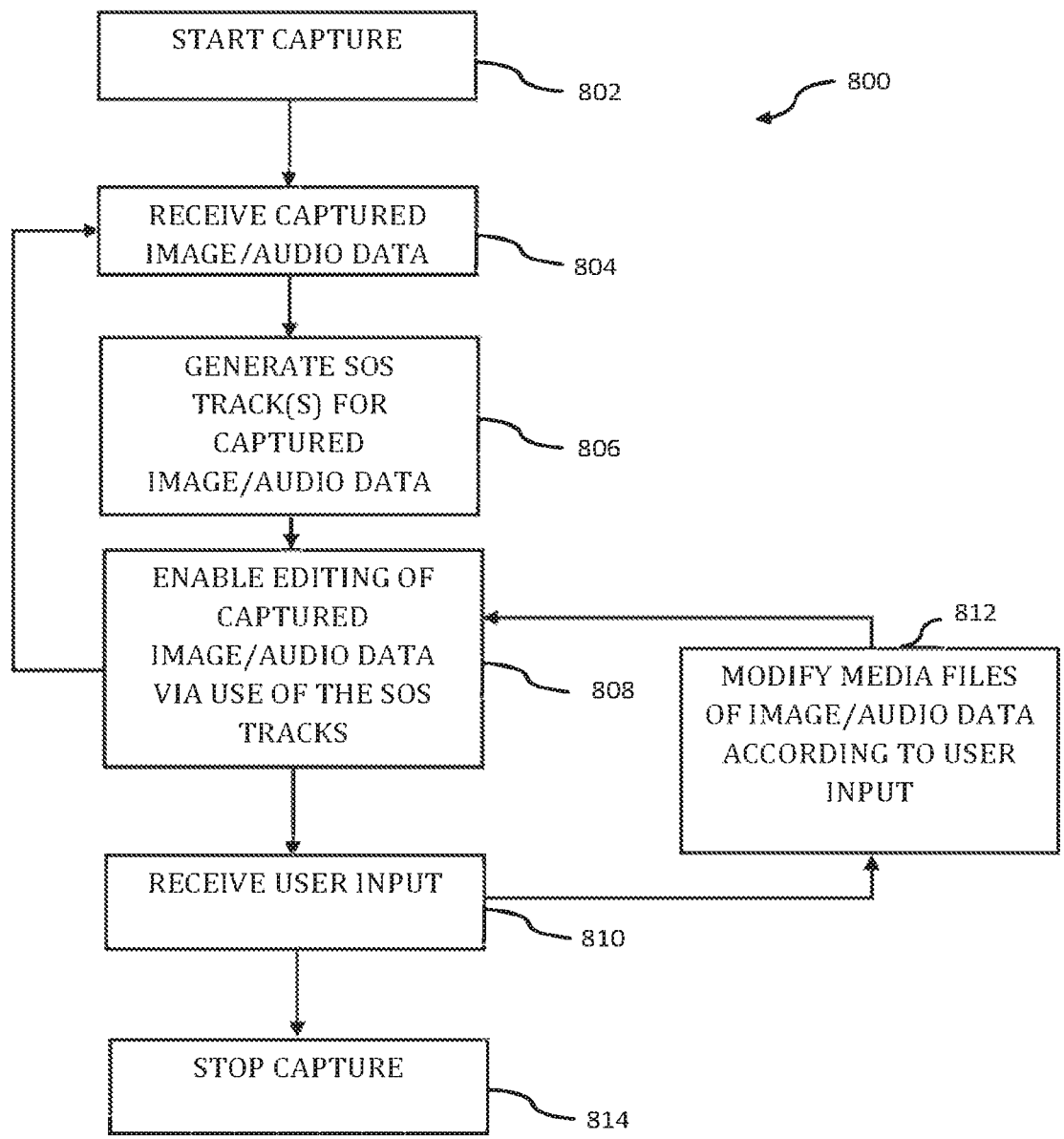
FIG. 8 is a logical flow diagram illustrating an exemplary methodology for the enabling editing of image/audio data during an ongoing capture or modification of the ongoing capture, in accordance with the principles of the present disclosure.

Referring now to FIG. 8, a logical flow diagram illustrating an exemplary methodology 800 for enabling editing of image/audio data during an ongoing capture or modification of the ongoing capture, is shown and described in detail. At step 802, the capture is started. At operation 804, the captured A/V data is received. For example, a camera may receive the A/V data, or the camera may simply capture the A/V data and transmit it to another device (e.g., a client or server apparatus).

At operation 806, one or more SOS tracks are generated for the captured A/V data. For example, the SOS tracks may be generated in accordance with method 500 of FIG. 5. Additionally, the SOS tracks may be generated at the camera or on any other device (e.g., a client or server apparatus).

At operation 808, editing of the captured data is enabled via use of the SOS track(s) generated for the captured content. That is, a client device and/or server apparatus can construct or update an index using the SOS track(s), where the index includes data descriptive of the A/V data such that the A/V data can be accessed, located and rendered to enable editing. One or more editing tools may enable a user to input changes to one or more parameters of the records and/or media file. For example, when in time-lapse mode, the time lapse photo acquisition interval may be changed. For example, if the time lapse capture is going too fast when the time lapse photo acquisition interval is set to 30 seconds, the user may change the time lapse photo acquisition interval to 60 seconds so that an image is captured every 60 seconds rather than every 30 seconds. As another example, the user may decide that the captured content is too dark, so one or more editing tools can allow the user to change the exposure settings.

In various implementations, parameters of the already-captured media files may be changed, and the ongoing capture may also be changed (in other words, parameters of the new media files yet to be created may be changed with respect to the already-captured media files). For example, in the scenario described above, if the time-lapse capture is going too fast when the time lapse photo acquisition interval is set to 30 s, the user may change the time lapse photo acquisition interval to 60 s so that an image (or group of images) is received every 60 s rather than every 30 s. This would mean the records received going forward from the point of time when the user input was received would be changed; however, the already-captured images have already been at a certain rate so would not be able to be changed in that respect. As such, a multi-rate time lapse would be produced. Note that while the foregoing scenario is described in the context of a change in interval or rate based on a subsequent (or "on the fly") user input, the present disclosure further contemplates use cases where the user can affirmatively specify such multi-rate time lapses or captures, including before the start of the capture. For instance, the user may specify that the first period (e.g., hour) of a time lapse is conducted at a first sampling or capture interval, while a second period (e.g., the subsequent 6 hours, or the remainder of the time lapse, or other) is conducted according to a different interval.

However, it will also be appreciated that some settings or parameters may be globally modifiable (i.e., for ongoing capture in the future, as well as for previously captured data). For instance, in another scenario, the user may want to change an exposure, brightness, contrast, or other setting associated with not the capture of the data but rather the processing of the captured data. As such, since the captured data (for past periods) is already stored, and the future captures can be manipulated in any way, processing applied to both can be reconciled or harmonized if desired.

At operation 810, user input is received (for example, via the editing tool(s) or interface associated therewith). At operation 812, at least a portion of the media files (e.g., one or more records therein) are modified according to the user input.

After the user is satisfied with the time-lapse capture, the time-lapse capture can be stopped per operation 814. It will also be appreciated that the methods and apparatus described herein may be used to "close out" an improperly closed data structure or file. As noted above, in the event an improper closure of the capture is experienced under prior approaches, there is no index to enable proper closeout of the file. However, using the methods and apparatus described herein, the stored track data may be used to rebuild the index (such as in the camera apparatus itself) so that the file can be closed correctly such that it becomes a valid structure (e.g., MP4).

Exemplary Apparatus—

Figure 9:
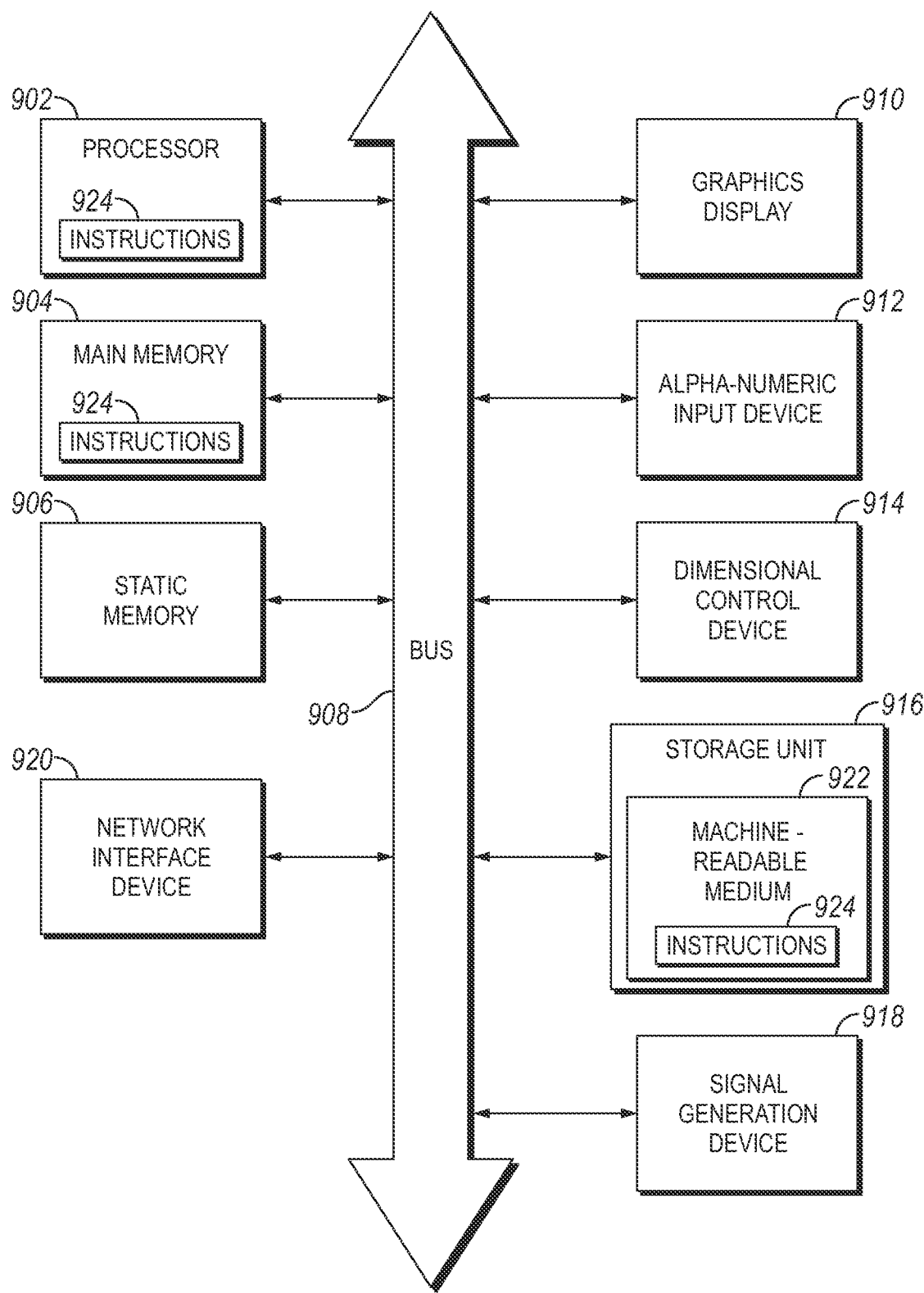
FIG. 9 is a block diagram of an exemplary implementation of a computing device, in accordance with the principles of the present disclosure.

FIG. 9 is a block diagram illustrating components of an example computing system 900 able to read instructions from a computer-readable medium and execute them in one or more processors (or controllers). The computing system 900 in FIG. 9 may 9 may represent an implementation of, for example, a capture device (110, FIGS. 1A and 1B) and/or client device (112, FIGS. 1A and 1B) for constructing an index for captured content (e.g., a time-lapse video) via use of one or more SOS tracks. The computing system 900 may include a separate standalone computing device (e.g., a laptop, desktop, server, etc.) in some implementations. For example, the computing system may include a server apparatus that is used to process the captured content.

The computing system 900 may be used to execute instructions 924 (e.g., program code or software) for causing the computing system 900 to perform any one or more of the methodologies (or processes) described herein. The computing system 900 may include, for example, an action camera (e.g., a camera capable of capturing, for example, a 360° FOV), a personal computer (PC), a tablet PC, a notebook computer, or other device capable of executing instructions 924 (sequential or otherwise) that specify actions to be taken. In another embodiment, the computing system 900 may include a server. In a networked deployment, the computing system 900 may operate in the capacity of a server or client in a server-client network environment, or as a peer device in a peer-to-peer (or distributed) network environment. Further, while only a single computer system 900 is illustrated, a plurality of computing systems 900 may operate to jointly execute instructions 924 to perform any one or more of the methodologies discussed herein.

The example computing system 900 includes one or more processing units (generally processor apparatus 902). The processor apparatus 902 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of the foregoing. The computing system 900 may include a main memory 904. The computing system 900 may include a storage unit 916. The processor 902, memory 904 and the storage unit 916 may communicate via a bus 908. One or more of the storage unit 916, main memory 904, and static memory 906 may be utilized to store, inter alia, media (e.g., image data and/or audio data) that includes the SOS track(s).

In addition, the computing system 900 may include a display driver 910 (e.g., to drive a plasma display panel (PDP), a liquid crystal display (LCD), a projector, or other types of displays). The computing system 900 may also include input/output devices, e.g., an alphanumeric input device 912 (e.g., touch screen-based keypad or an external input device such as a keyboard), a dimensional (e.g., 2-D or 3-D) control device 914 (e.g., a touch screen or external input device such as a mouse, a trackball, a joystick, a motion sensor, or other pointing instrument), a signal capture/generation device 918 (e.g., a speaker, camera, and/or microphone), and a network interface device 920, which also are configured to communicate via the bus 908.

Embodiments of the computing system 900 corresponding to a client device may include a different configuration than an embodiment of the computing system 900 corresponding to a server. For example, an embodiment corresponding to a server may include a larger storage unit 916, more memory 904, and a faster processor 902 but may lack the display driver 910, input device 912, and dimensional control device 914. An embodiment corresponding to an action camera may include a smaller storage unit 916, less memory 904, and a power efficient (and slower) processor 902 and may include one or more capture devices 918.

The storage unit 916 includes a computer-readable medium 922 on which is stored instructions 924 (e.g., a computer program or software) embodying any one or more of the methodologies or functions described herein. The instructions 924 may also reside, completely or at least partially, within the main memory 904 or within the processor 902 (e.g., within a processor's cache memory) during execution thereof by the computing system 900, the main memory 904 and the processor 902 also constituting computer-readable media. The instructions 924 may be transmitted or received over a network via the network interface device 920.

While computer-readable medium 922 is shown in an example embodiment to be a single medium, the term "computer-readable medium" should be taken to include a single medium or multiple media (e.g., a centralized or distributed database, or associated caches and servers) able to store the instructions 924. The term "computer-readable medium" shall also be taken to include any medium that is capable of storing instructions 924 for execution by the computing system 900 and that cause the computing system 900 to perform, for example, one or more of the methodologies disclosed herein.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computing device", includes, but is not limited to, image capture devices (e.g., cameras), personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, Ruby, Kotlin, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "camera" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A camera for enabling playback of captured media during media capture, the camera comprising:
   an image sensor configured to capture video frames; and
   one or more processors, the one or more processors configured to
      start a video capture, the video capture including capture of the video frames for a video, wherein an index for the video is generated by the one or more processors at an end of the video capture;
      during the video capture, generate a parameter track for the captured video frames, the parameter track enabling a client device separate from the camera to construct a full index for the captured video frames before generation of the index for the video by the one or more processors of the camera at the end of the video capture, the parameter track enabling playback of the captured video frames on the client device before the video capture is stopped on the camera; and
      transmit the captured video frames and the parameter track for the captured video frames to the client device, wherein the client device generates the full index for the captured video frames based on the parameter track and displays the captured video frames based on the full index while the video capture is ongoing on the camera.
2. The camera of claim 1, wherein the video capture includes a time lapse video capture, and the video includes a time lapse video.
3. The camera of claim 2, wherein the captured video frames are displayed on the client device as a first loop.
4. The camera of claim 3, wherein later captured video frames are displayed on the client device as a second loop or as a refreshed first loop.
5. The camera of claim 2, wherein the display of the captured video frames on the client device enables an interval or an exposure setting at which the video frames are captured by the camera to be changed while the video capture is ongoing.
6. The camera of claim 1, wherein the parameter track for a given video frame is indicative of or derived from one or more parameters of the given video frame.
7. The camera of claim 1, wherein the parameter track for a given video frame includes a frame number for the given video frame.
8. The camera of claim 1, wherein the parameter track for a group of video frames includes a start time and a time duration for the group of video frames.
9. The camera of claim 1, wherein the client device includes a mobile device.
10. A method for enabling playback of captured media during media capture, the method performed by a camera including an image sensor and one or more processors, the method comprising:
    starting a video capture, the video capture including capture of the video frames for a video, wherein an index for the video is generated by the one or more processors at an end of the video capture;
    during the video capture, generating a parameter track for the captured video frames, the parameter track enabling a client device separate from the camera to construct a full index for the captured video frames before generation of the index for the video by the one or more processors of the camera at the end of the video capture, the parameter track enabling playback of the captured video frames on the client device before the video capture is stopped on the camera; and
    transmitting the captured video frames and the parameter track for the captured video frames to the client device, wherein the client device generates the full index for the captured video frames based on the parameter track and displays the captured video frames based on the full index while the video capture is ongoing on the camera.
11. The method of claim 10, wherein the video capture includes a time lapse video capture, and the video includes a time lapse video.
12. The method of claim 11, wherein the captured video frames are displayed on the client device as a first loop.
13. The method of claim 12, wherein later captured video frames are displayed on the client device as a second loop or as a refreshed first loop.
14. The method of claim 11, wherein the display of the captured video frames on the client device enables an interval or an exposure setting at which the video frames are captured by the camera to be changed while the video capture is ongoing.
15. The method of claim 10, wherein the parameter track for a given video frame is indicative of or derived from one or more parameters of the given video frame.
16. The method of claim 10, wherein the parameter track for a given video frame includes a frame number for the given video frame.
17. The method of claim 10, wherein the parameter track for a group of video frames includes a start time and a time duration for the group of video frames.

18. The method of claim 10, wherein the client device includes a mobile device.

19. A camera for enabling playback of captured media during media capture, the camera comprising:
- an image sensor configured to capture video frames; and
- one or more processors, the one or more processors configured to
  - start a time lapse video capture, the time lapse video capture including capture of the video frames for a time lapse video, wherein an index for the time lapse video is generated by the one or more processors at an end of the time lapse video capture;
  - during the time lapse video capture, generate a parameter track for the captured video frames, the parameter track enabling a client device separate from the camera to construct a full index for the captured video frames before generation of the index for the time lapse video by the one or more processors of the camera at the end of the time lapse video capture, the parameter track enabling playback of the captured video frames on the client device before the time lapse video capture is stopped on the camera; and
  - transmit the captured video frames and the parameter track for the captured video frames to the client device, wherein the client device generates the full index for the captured video frames based on the parameter track and displays the captured video frames as a loop based on the full index while the time lapse video capture is ongoing on the camera.

20. The camera of claim 19, wherein the display of the captured video frames on the client device enables an interval or an exposure setting at which the video frames are captured by the camera to be changed while the time lapse video capture is ongoing.

\* \* \* \* \*